(12) United States Patent
Baransky et al.

(10) Patent No.: US 8,878,853 B2
(45) Date of Patent: Nov. 4, 2014

(54) VISUALIZATION OF A COLLECTION OF ORDERS

(71) Applicants: Yurij Baransky, Cortlandt Manor, NY (US); Vipul Nagrath, Croton-On-Hudson, NY (US)

(72) Inventors: Yurij Baransky, Cortlandt Manor, NY (US); Vipul Nagrath, Croton-On-Hudson, NY (US)

(73) Assignee: Bloomberg Finance L.P., New York, NY (US)

( * ) Notice: Subject to any disclaimer, the term of this patent is extended or adjusted under 35 U.S.C. 154(b) by 192 days.

(21) Appl. No.: 13/628,391

(22) Filed: Sep. 27, 2012

(65) Prior Publication Data

US 2014/0085306 A1   Mar. 27, 2014

(51) Int. Cl.
*G06T 11/20* (2006.01)
*G06Q 40/00* (2012.01)
*G06Q 40/04* (2012.01)

(52) U.S. Cl.
CPC .............. *G06Q 40/04* (2013.01); *G06T 11/206* (2013.01)
USPC ............................................. 345/440; 705/37

(58) Field of Classification Search
CPC .............................. G06Q 40/04; G06T 11/206
USPC ............................................ 345/440; 705/37
See application file for complete search history.

(56) References Cited

U.S. PATENT DOCUMENTS

| | | | | |
|---|---|---|---|---|
| 7,308,428 B1 * | 12/2007 | Federspiel et al. | .......... | 705/36 R |
| 7,403,921 B2 | 7/2008 | Tanpoco et al. | | |
| 7,412,415 B2 | 8/2008 | Waddell | | |
| 8,195,559 B2 * | 6/2012 | Heaton et al. | .................... | 705/37 |
| 2002/0069152 A1 * | 6/2002 | B.C et al. | ........................ | 705/37 |
| 2004/0044613 A1 * | 3/2004 | Murakami et al. | .............. | 705/37 |
| 2004/0068454 A1 * | 4/2004 | Jacobus et al. | ................. | 705/36 |
| 2006/0085310 A1 * | 4/2006 | Mylet et al. | ..................... | 705/35 |
| 2006/0095362 A1 * | 5/2006 | Hwang et al. | .................... | 705/37 |
| 2006/0287945 A1 * | 12/2006 | Spaccatrosi | ..................... | 705/37 |
| 2007/0088648 A1 * | 4/2007 | Mather et al. | ............... | 705/36 R |
| 2010/0106332 A1 * | 4/2010 | Chassin et al. | ................ | 700/278 |
| 2010/0174665 A1 | 7/2010 | Lanng | | |
| 2010/0257119 A1 | 10/2010 | Sugita et al. | | |
| 2010/0262901 A1 * | 10/2010 | DiSalvo | ...................... | 715/227 |
| 2011/0087587 A1 * | 4/2011 | Mylet et al. | ..................... | 705/37 |
| 2011/0153508 A1 * | 6/2011 | Jhunjhunwala | ............... | 705/306 |

* cited by examiner

*Primary Examiner* — David T Welch
(74) *Attorney, Agent, or Firm* — Jon E. Gordon; Frank J. DeRosa; Frommer Lawrence & Haug LLP

(57) ABSTRACT

Systems and methods may provide tools for uniformly visualizing a series of one or more orders, wherein orders of vastly different prices, order types, and order assets may be commingled on the same display screen. Such a collection of tools may be sorted for display. The displays may be buy/sell independent, handle any size bid/ask spread, and allow easy determination of the relative marketability of each order. Such systems and methods may help a user to focus on orders requiring the most attention.

3 Claims, 5 Drawing Sheets

| | Strategy Name | Status | SID | Price Conv | Setup Signal | Setup Quote | Setup Limit | Setup Price | Setup AvgPx | Setup Qty | Setup FillQty |
|---|---|---|---|---|---|---|---|---|---|---|---|
| 1 | Strategy A | Done | 8857701 | Merger | | | -19.19 | 30.13 | -19.181 | 1,505 | 1,505 |
| 2 | Strategy B | Cxl | 8857801 | Equity | | | -11.42 | -9.44 | 0.0800 | 1,087 | |
| 3 | Strategy C | Done | 8857501 | Spread | | | 11.92 | 12.26 | 12.0260 | 1,564 | |
| 4 | Strategy D | CxlPFill | 8857301 | Spread | | | 0.00 | -886.90 | -0.0050 | 5,000 | 1,100 |
| 5 | Strategy E | CxlPFill | 8857401 | Spread | | | 7.29 | -863.48 | 1.2834 | 5,000 | 5,000 |
| 6 | Strategy F | CxlPFill | 8857201 | Spread | | | 4.60 | 0.00 | 4.8038 | 5,000 | 500 |
| 7 | Strategy G | Done | 8857101 | Spread | | | 3.00 | -1,783.94 | 0.0000 | 14,249 | |
| 8 | Strategy H | Cxl | 8858001 | Merger | | | 1.90 | 67.07 | 1.4024 | 38,500 | 38,500 |
| 9 | Strategy I | CxlPFill | 8859901 | Ratio | | | 0.01 | -3.77 | 0.0000 | 250,000 | |
| 10 | Strategy J | Cxl | 8859801 | Spread | | | 4.65 | 5.10 | 4.8500 | 200 | 30 |
| 11 | Strategy K | Cxl | 8859701 | Ratio | | | 1.90 | 0.54 | 0.0000 | 55,000 | |
| 12 | Strategy L | Cxl | 8859601 | Ratio | | | 1.12 | 1.16 | 0.0000 | 5,000 | |
| 13 | Strategy M | Cxl | 8859501 | Spread | | | 1.05 | 0.96 | 0.0000 | 10,000 | |
| 14 | Strategy N | Done | 8859401 | Merger | | | | -4.61 | | | |
| 15 | Strategy O | Cxl | 8859301 | Ratio | | | 0.93 | 0.00 | 0.0000 | 10,000 | |

FIG. 4

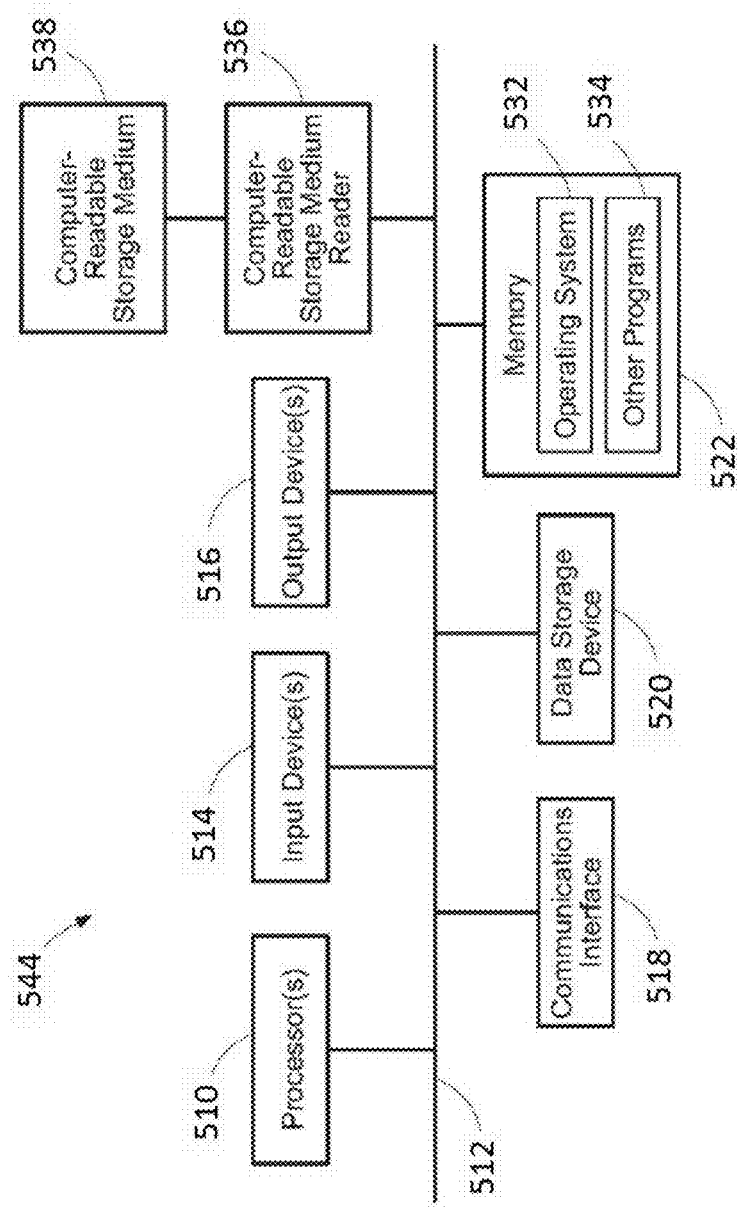

VISUALIZATION OF A COLLECTION OF ORDERS

COPYRIGHT AND LEGAL NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

This application contains material relating to the trading of financial interests. The trading of some financial interests is regulated, as for example by the United States Government, various State governments, and other governmental agencies within the United States and elsewhere. The disclosure herein is made solely in terms of logical and financial possibility and advantage, without regard to possible statutory, regulatory or other legal considerations. Nothing herein is intended as a statement or representation of any kind that any system, method, or process proposed or discussed herein does or does not comply with any legal requirement whatsoever, in any jurisdiction; nor should it be taken or construed as doing so.

BACKGROUND

Trading strategies grow ever more complex. Any particular order may include trades in multiple instruments, and each instrument typically has its own pricing, which may include, for example, the price of the last trade and the current bid and offer. The multiplicity of instruments in an order thus implies a multiplicity of values that might be relevant to a trading decision, complicating decision-making in an environment that tends to reward speed, not deliberation. And even simpler strategies may benefit from better presentation of market information.

SUMMARY OF THE INVENTION

Embodiments of the invention relate to displays and user interfaces that include information about tradable interests. Such interests may include, for example, stocks, debt instruments, commodities, pollution credits, and insurance. Such interests may include both underlying and derivative interests, as well as spot, futures, and forward contracts. More generally, embodiments of the invention may be applicable to any instrument or asset that trades or may be traded in a way that is similar to any one or more of the foregoing.

Trading, as for example in connection with an embodiment of the invention, may be considered to take place at a venue. Venues can include any financial market in which such assets are traded or exchanged, whether a primary market, a secondary market, a physical market, an electronic market, a proprietary market, or some other type of market. This can include stock markets, bond markets, capital markets, derivatives markets, commodity markets, money markets, futures markets, insurance markets, foreign exchange markets, and currency markets.

"Order" is used in a broad sense herein, and can include any offer to buy or sell assets. Depending on the context, an order may also mean an instruction or set of instructions related to one or more such offers or to a representation of such stored, for example, in written or electronic form.

Each bid or offer in an order may be considered a "leg." Orders may have one leg or multiple legs, and a leg may include any type of order, including market orders, limit orders, stop orders, and stop limit orders, among a great many others.

Systems and methods according to embodiments of the invention can display simultaneously information about many disparate orders, including, for example, orders of different prices, order types, and assets. Such uniform presentation may help a user identify those orders that require the most attention.

According to embodiments of the invention, a method exists for providing information relating to marketability of one or more orders, where each order comprises one or more legs, and each leg reflects an interest in buying or selling a respective asset in one or more venues. The method is performed by a computer system that comprises one or more processors, one or more interfaces operatively coupled to at least one of the processors, and at least one electronic display device operatively coupled to at least one of the processors.

According to embodiments of the invention, the method comprises receiving through at least one of the interfaces first order information that, for a first order, includes at least information from which a price for the first order may be determined and, for each of the legs of the order, identifies the respective asset and whether the respective asset is to be bought or sold. The method also comprises receiving through at least one of the interfaces first order pricing information that comprises information from which a passive price for the first order at a first time and an aggressive price for the first order at the first time may be computed.

The method also comprises presenting on the electronic display device a marketability graph for the first order. The marketability graph comprises, for the first order, an axis having a length, a passive price marker at a first location on the axis, and an aggressive price marker at a second location on the axis. The marketability graph also comprises an order price marker at a first location on the axis, where that location represents the price of the order relative to the passive price of the order at the first time and the aggressive price of the order at the first time.

According to an embodiment of the invention, the method comprises, subsequent to presenting the marketability graph for the first order, receiving through at least one of the interfaces second order pricing information that comprises information from which a passive price for the first order at a second time and an aggressive price for the first order at the second time may be computed. The method also comprises, in response to receiving the second order pricing information, modifying the marketability graph for the first order by moving the order price marker along the axis to a second location that reflects the price of the order relative to the passive price of the order at the second time and the aggressive price of the order at the second time. According to the embodiment of the invention, this modification of the marketability graph excludes modification of the size or position of the axis, the location of the passive price marker relative to the axis, and the location of the aggressive price marker relative to the axis.

Embodiments of the invention further include computer systems that are programmed to carry out the above methods and computer-readable storage media that are non-transitorily encoded with instructions that, when executed by one or more processors within a computer system, cause that computer system to carry out the above methods.

BRIEF DESCRIPTION OF THE DRAWINGS

Embodiments of the invention are illustrated in the figures of the accompanying drawings, which are meant to be exemplary and not limiting, and in which like references are intended to refer to like or corresponding parts.

FIG. 4 depicts a trading screen that includes marketability graphs and signal strength indicators according to an embodiment of the invention.

FIG. 5 is a block diagram that depicts elements of a computer system with which embodiments of the invention may at least be partially implemented.

DETAILED DESCRIPTION OF PREFERRED EMBODIMENTS

Embodiments of the invention relate to simplified graphics that show information about the marketability of orders or series of orders. "Marketability" refers herein to the likely ability to effect the trade or trades that would make up an order in view of current market conditions. As described below, the marketability of an order may depend upon the absolute or relative prices of its components (taken singly or collectively) and the current bids and offers for those assets in one or more venues.

Figure 1:
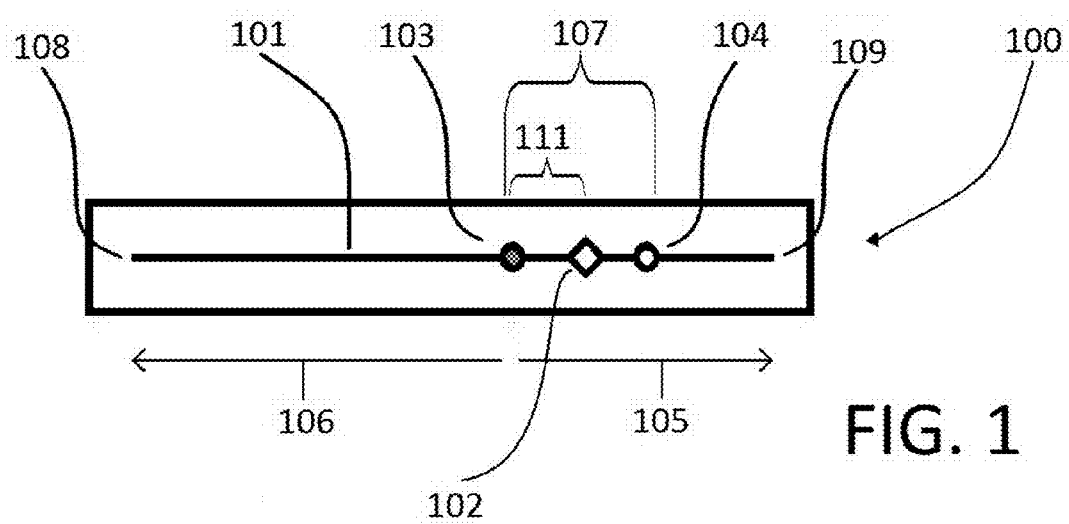
FIG. 1 depicts a marketability graph according to an embodiment of the invention.

FIG. 1 depicts an exemplary marketability graph 100 according to an embodiment of the invention. The marketability graph 100 may show a user at a glance the relative marketability of an order based on the order price for a given asset and the current bid-ask spread for that asset.

The depicted marketability graph 100 includes an axis 101, an order price marker 102, a passive price marker 103, and an aggressive price marker 104. As these terms are used herein, an aggressive price, relatively speaking, is a price at which an order is more likely to be filled, and conversely, a passive price is a better price (from the user's perspective), but one at which an order is less likely to be filled based on the markets at a given time.

The depicted axis 101 represents the price of the order as a whole. As depicted, movement along the axis 101 to the right indicates increasingly aggressive prices, while movement on the left indicates increasingly passive prices. For these reasons, the left end 108 of the axis 101 may be referred to as the passive end, and the right end 109 may be referred to as the aggressive end.

In an embodiment of the invention such as FIG. 1 depicts, a passive price marker 103 and an aggressive price marker 104 delimit a range of prices along the price axis 101 within which total or partial execution of the order may be possible. The passive price marker 103 marks the best price (from the user's perspective) within this range, which is also the price within the range at which execution is least likely. Conversely, the aggressive price marker 104 marks the worst price, which may nonetheless be the best price at which the user can be assured of trading at least a part of the order. (For convenience, the price that corresponds to the position of the passive price marker 103 may be referred to as the passive price, and the price that corresponds to the position of the aggressive price marker 104 may be referred to as the aggressive price.)

In the simplest case, the order is an order to buy or sell a single asset. If such an order is a buy order, the aggressive price is typically the best (i.e., lowest) ask price at the time. The ask price represents a tradable offer to sell some quantity of the asset in some venue at the displayed price, and a buyer may be confident of trading if the user's corresponding buy order reaches the venue before the offer is withdrawn or traded against another buy order.

The passive price for a buy order is typically the best (i.e., highest) bid price at the time. At this price, an order may be unlikely to trade right away, but might trade if a seller were to transmit a new sell order to the venue. A buy order at a price lower than the passive price might be even less likely to trade, having to wait for all buy orders priced above it to trade first.

Conversely, for an order to sell a single asset, the aggressive price is typically the best bid price, and the passive price is typically the best ask price.

In connection with an embodiment of the invention, the best bid price and best ask price (either of which may sometimes be referred to as the best offer price by those in the art) may be obtained from any appropriate source. For example, for publicly-traded stocks, they may be derived from the limit orders, for example, on a specialist's book, at the time.

In addition to the passive price marker 103 and the aggressive price marker 104, a marketability graph 100 according to an embodiment of the invention may include an order price marker 102. As discussed below, the order price marker may appear along the axis 101 at a location that corresponds to the user's price for the order.

For example, in connection with an embodiment of the invention, a user may have an order to buy a security at some price P. At some time when the marketability graph 100 is displayed, the passive price (here, the highest bid already in the marketplace) may be $50, and the aggressive price (the lowest offer in that marketplace) may be $52. If P is below $50, the order price marker 102 will appear along the axis 101 to the left of the passive price marker 103, and if P is above $52, the order price marker 102 will appear to the right of the aggressive price marker 104. If P is $51, the order price marker will appear somewhere on the axis 101 between the other two markers. If P is exactly $50 or $52, the order price marker 102 may be superimposed on the passive price marker 103 or the aggressive price marker 104, whichever is appropriate.

The marketability graph 100 according to embodiments of the invention has so far been discussed in connection only with orders that have exactly one leg. The invention is not limited to such orders, however, and a single marketability graph 100 according to embodiments of the invention may show the marketability of an order that has an arbitrary number of legs.

The price of a multi-leg order may be considered to be the weighted net price of all of the legs combined. For example, an order may have two legs, where the first leg involves buying two hundred shares of stock A, and the second leg involves selling one hundred shares of stock B. The order involves buying two shares of stock A for every share of stock B that is sold, so the price of stock A is weighted twice as heavily. Thus, if the order were executed so that stock A were bought at $51 per share, and stock B were sold at $100 per share, the net price of the order would be two dollars. (2×$51−$100=$2.) The net price of a multi-leg order may be referred to herein as the order price for that order.

The passive price for a multi-leg order may be the weighted net of the passive prices for all of the legs, and, similarly, the aggressive price may be the weighted net of the aggressive prices for all of the legs. To continue with the previous example, at some time, the highest bid for stock A may be $50 per share, and the lowest offer for stock A may be $51 per share. At that same time, the highest bid for stock B may be $99, and the lowest offer may be $101.

The passive price for the order would be the weighted net of the passive prices of each of the legs. Because the first leg is a buy order, the passive price of that leg is the current highest bid for stock A, which is $50. The second leg is a sell order, so that passive price of that leg is the current lowest offer for stock B, which is $101. The passive price of the order would then be 2×$50−$101=−$1 per share. (The negative price signifies that the result of the transaction would be a net cash inflow if the order were to be traded at these prices.) The aggressive price of the order, meanwhile, would be 2×$51−$99=$3 per share.

As discussed below, embodiments of the invention may display marketability graphs 100 for multiple orders at a time, and the orders displayed at a single may differ widely in, e.g., their respective numbers of legs, asset types, order types, etc. To help a user see at a glance the relative marketability of many disparate orders, certain properties of marketability graphs 100 may in an embodiment of the invention be standardized or held constant for all orders or all orders in one or more classes.

According to embodiments of the invention, one end of the axis 101 may consistently be the passive end 108 and the other the aggressive end 109, regardless of whether any individual order is a buy or a sell. In other words, the aggressive price marker 104 and the passive price marker 103 do not change their left-to-right ordering on the axis 101 based on whether an order is a buy or a sell. In such embodiments, a user may be able to tell at a glance whether prices for an order are better or worse without having to remember, for example, whether "better" for a particular order means higher or lower, or left or right.

Additionally, according to embodiments of the invention, the length of the axis 101 and the locations along that axis 101 of the passive price marker 103 and the aggressive price marker 104 may be invariant, regardless of the composition of the respective graphed order and the prices associated with any and all of the legs. As a corollary, according to embodiments of the invention, the passive and aggressive price markers do not move along axis 101 despite changes in the best bid prices and the best ask prices.

To put this another way, the physical spacing between the markers on the axis 101 (which may in connection with an embodiment of the invention be expressed, for example, in terms of a number of pixels or other unit of length)—referred to herein as the spread length 107—may be static even as the bid-ask spread is changing. For example, the positions of the aggressive price marker 104 and the passive price marker 103 on axis 101 may be the same for a bid-ask spread that is $0.01 wide as it is for a bid-ask spread that is $100.00 wide.

The length of axis 101 and other lengths and distances related to a marketability graph 100 may be discussed herein in terms of the spread length 107. So, for example, if the length of axis 101 equals three times the spread length 107, the axis 101 may be said to be three spread lengths long.

In an embodiment of the invention such as FIG. 1 depicts, axis 101 has more than two spread lengths on the passive side of the passive price marker 103 and more than one spread length on the aggressive side of the aggressive price marker 104. In any particular embodiment of the invention, however, these proportions may be different. Alternate embodiments of the invention may allow a user to customize the length of the axis 101 on each side of the passive price marker 103 and aggressive price marker 104, e.g., by specifying preferences in ways such as are well known in the art.

Against the axis 101 and the fixed reference points of the passive price marker 103 and aggressive price marker 104, the order price marker 102 indicates the relative marketability of the order by varying its location 111 on the axis 101. This variable location 111 may be a function of, for example, the order price, the passive price, the aggressive price, and the spread length 107.

In an embodiment of the invention, the function that determines the location of the order price marker 102 may be linear. Thus, for example, if the order price is exactly equal to the passive price, the order price marker 102 may be superimposed on the passive price marker 103; if it is exactly equal to the aggressive price, the order price marker 102 may be superimposed on the aggressive price marker 104; and if it is exactly equal to the arithmetic mean of the passive price and the aggressive price, the order price marker 102 may appear exactly halfway between the passive price marker 103 and the aggressive price marker 104. For other prices, the placement of the order price marker 102 may depend proportionally to the differences between the order price and the passive and aggressive prices.

The axis 101 has finite length, however, and the price of an order may correspond to a location that is beyond an end of the axis 101. In that case, in an embodiment of the invention, the order price marker 102 may be pinned at the end of the axis 101 representing the price nearest to the actual order price. In this way, the linearity of the relationship between the location of the order price marker 102 and the other price markers may abruptly break down.

It will be appreciated that in embodiments of the invention, the position of the order price marker 102 may depend nonlinearly on the absolute and/or relative price or prices in other ways over some or all of the axis 101. To give one example among many other possibilities, in an embodiment of the invention, the positioning may be linear for prices between the passive price and the aggressive price, but nonlinear according to any function judged to give a useful result in the for prices not in this range.

As noted earlier, in the exemplary embodiment of the invention, axis 101 has a greater number of spread lengths 107 on the passive side 106 of the passive price marker 103 than it has on the aggressive side 105 of the aggressive price marker 104. This difference in spread lengths 107 between the passive side 106 and the aggressive side 105 may in an embodiment of the invention reflect, e.g., the relative likelihoods of fills on the respective sides. On the aggressive side 105 of the aggressive price marker 104, the offer price is more aggressive than the associated bid or offer. All else being equal, an offer price that is more aggressive than the market may be more likely to be executed than other orders because the more aggressive order is priced better for prospective counterparties.

The axis 101 is depicted as a horizontal axis, but it could alternately, according to embodiments of the invention, be oriented vertically or diagonally. The axis 101 can be any color, shape, or combination of colors and shapes. Additionally, axis 101 may change color, shape, or both depending on one or more conditions. Similarly, the markers used to depict the order price 102, passive price 103, and aggressive price 104 may be any color or shape, they may be the same color or different colors, the same shape or different shapes, and may change colors, shapes, or both depending on one or more conditions. These markers may be located on or near the axis 101 and may change their orientation with respect to the axis 101 depending on one or more conditions.

It will be appreciated that the order price may be fixed over time, whether the order has one leg or many. Conversely, the bids and offers used to determine the passive and aggressive prices (and the respective spreads between them) may vary frequently, in some cases varying over time spans less than one second. But according to embodiments of the invention such as FIG. 1 depicts, the static order price is represented by the moving order price marker 102, while the varying passive and aggressive prices are depicted by the stationary passive price marker 103 and aggressive price marker 104. Such a presentation may allow a user, for example, to tell at a glance the relative marketability of an order, considered either in isolation or relative to other orders.

Figure 2:
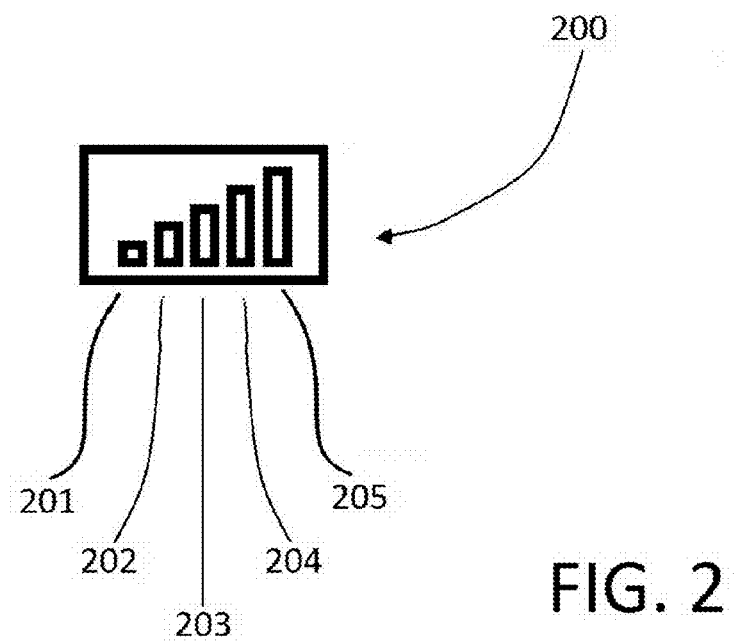
FIG. 2 depicts a signal strength indicator according to an embodiment of the invention.
Figure 6:
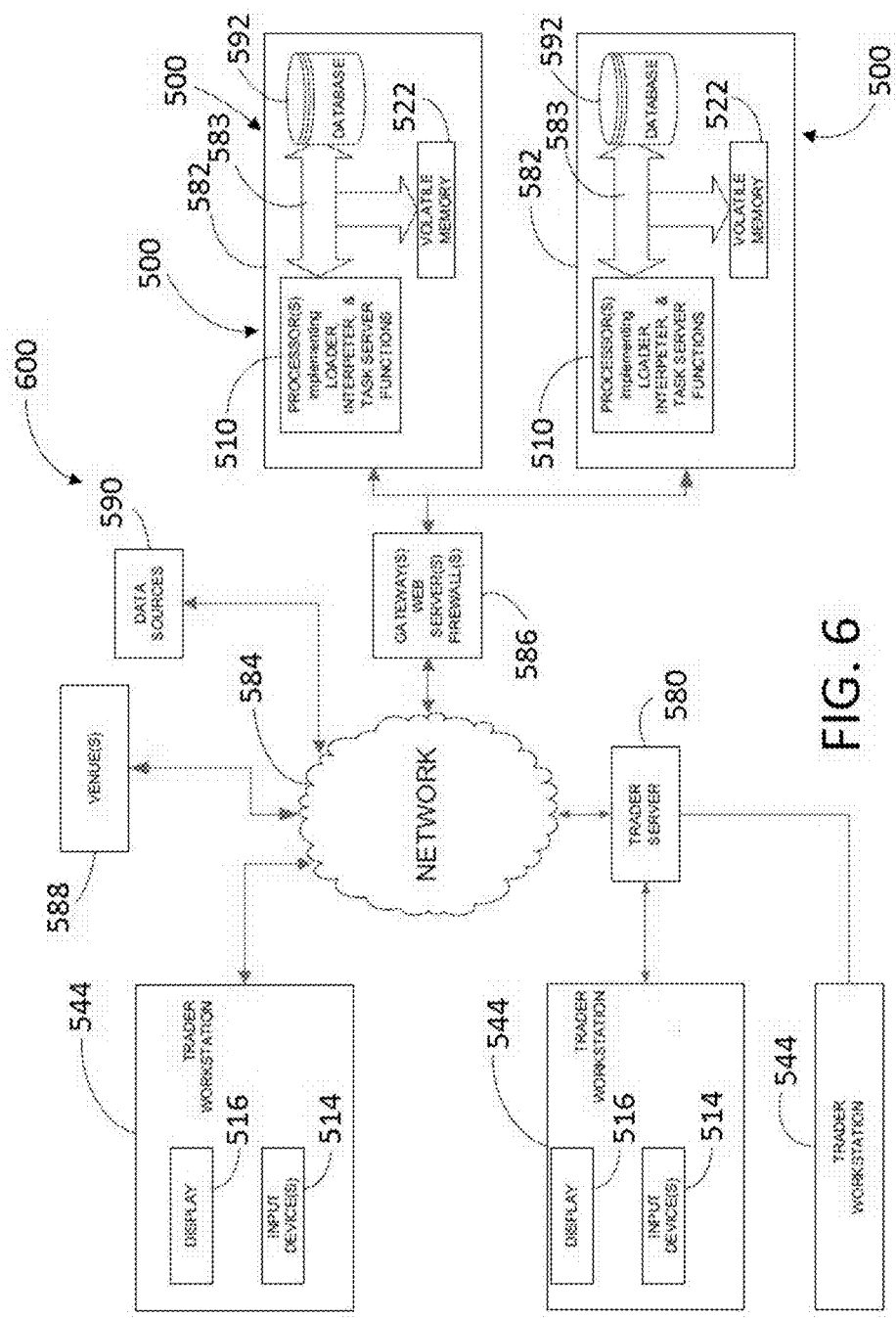
FIG. 6 is a block diagram that depicts elements of a trading network with which embodiments of the invention may at least be partially implemented.

FIG. 2 depicts an indicator 200 that may in an embodiment of the invention provide another indication of the relative marketability of an order. Because the depicted indicator 200 resembles well-known indicators of wireless signal strength (not pictured), the indicator 200 may be referred to herein and in connection with embodiments of the invention as a "signal strength indicator". The relative marketability is shown by the number of bars that are illuminated. The greater number of bars illuminated, the greater the relative marketability of the order. As with other exemplary embodiments described herein, signal strength indicator 200 may be displayed, for example, on display 516 of trader workstation 544, as depicted in FIG. 6.

The depicted embodiment of the invention includes a chart with five bars (201-205), although more or fewer bars may be used. The appearance of the bars may change to give the appearance of one or more bars being illuminated (or not) and/or otherwise change in size, shape, color, or any or all of these, to convey information to the user. As FIG. 2 depicts, the five bars are placed side-by-side in a stair-step configuration. Although the bars are arranged in this manner in the depicted embodiment of the, the color, size, or shapes of the bars, or any combination thereof, may be changed in any manner that will convey information to a user.

In an embodiment of the invention such as FIG. 2 depicts, the illumination of the bars conveys information about the status of the order and its marketability. For example, in an embodiment of the invention, the first bar 201 may be illuminated whenever the represented order has not yet been completely filled. Conversely, all bars may be darkened once the represented order has been completely filled.

If the first bar 201 is illuminated, one or more additional bars also may be illuminated to indicate the relative marketability of the order. For example, the second bar 202 may be illuminated when the order price is no more than three spread units more passive than the passive price. The third bar 203 may be illuminated when the order price is no more than two spread units more passive than the passive price. The fourth bar 204 may be illuminated the order price is no more than one spread unit more passive than the passive price. And the fifth bar 205 may be illuminated when the spread is marketable, i.e., when the order price is either equal to the passive price or more aggressive than the passive price.

Further, in an embodiment of the invention, all five of the bars 201-205 may be illuminated and presented in a different color when the order price is at least as aggressive as the aggressive price. For example, in an embodiment of the invention, all "illuminated" bars 201-205 may appear as yellow rectangles so long as the order price is no more aggressive than the aggressive price, but all five bars may appear as white rectangles once the order price reaches the aggressive price.

As a concrete example, an order, not yet completely filled, may consist of a single leg, which may be to sell stock B. If the current best bid for stock B is $100 and the current best offer is $102, a signal strength indicator according to an embodiment of the invention may reflect different order prices as in Table 1.

TABLE 1

| Order Price (for selling stock B) | Appearance |
|---|---|
| greater than $108 | 1 yellow bar |
| less than or equal to $108 but greater than $102 | 2 yellow bars |
| less than or equal to $106 but greater than $104 | 3 yellow bars |
| less than or equal to $104 but greater than $102 | 4 yellow bars |
| less than or equal to $102 but greater than $100 | 5 yellow bars |
| less than or equal to $100 | 5 white bars |

Figure 3:
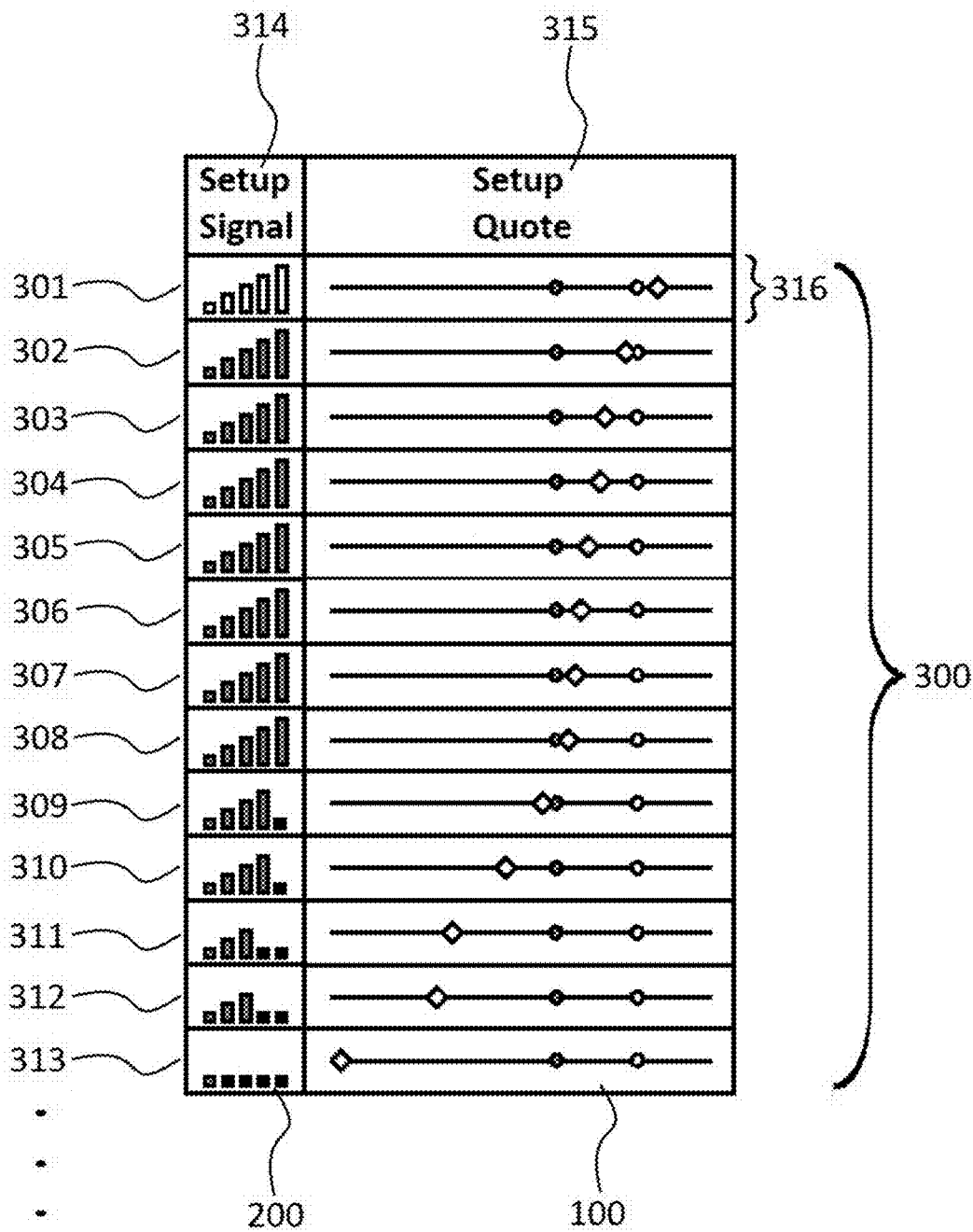
FIG. 3 depicts a display of multiple orders according to an embodiment of the invention, such as may appear on an electronic display device.

FIG. 3 depicts a series of orders according to an embodiment of the invention. As depicted, the order series 300 appears as a collection of marketability graphs 100 and signal strength indicators 200. Some or all of the orders may be somehow related (apart from being displayed on the same screen at one time), but it is also possible for all displayed orders to be entirely independent. An order series 300 according to an embodiment of the invention may be displayed, for example, on display 516 of trader workstation 544, as depicted in FIG. 6.

The depicted order series 300 includes a plurality of marketability graphs 100. In the embodiment of the invention depicted in FIG. 3, the order series 300 also includes a signal strength indicator 200 for each marketability graph 100. Alternative embodiments of the order series 300, not pictured, need not use both the marketability graphs 100 and the signal strength indicators 200, but can use one or the other. In an embodiment of the invention, also not pictured, some orders in the order series 300 may have both a marketability graph 100 and a signal strength indicator 200, while other orders may have only one of them, and still other orders may have neither.

Additionally, the number of orders depicted (e.g., 301 through 313 in FIG. 3) may reflect a number of outstanding orders that have not yet been completely filled, and thus, in an embodiment of the invention, the number of displayed orders may vary from time to time. When an order is partially filled, that fact may be indicated, e.g., by changing colors, sizes, shading, or symbols, or any combination thereof, but it need not be indicated at all. When an order has been completely filled, it may be removed from the order series 300, or the fill may be indicated, e.g., by changing colors, sizes, shading, or symbols, or any combination thereof. Alternatively, the filling of the order may not need to be indicated at all.

Similarly, an order that is not to be traded until fulfillment of a condition precedent (e.g., conditions based on timing, the execution of other legs, market information, external triggers, etc.) may not be displayed, or that order may be displayed using different colors, size, shading, or symbols, or any combination thereof, to reflect that a condition precedent is lacking.

As FIG. 3 depicts, the order series 300 is sorted with the most marketable order (viz., order 301) at one end of the chart and the least marketable order (viz., order 313) at the other end of the chart, with the orders in between (viz., orders 302 through 312) sorted according to their relative marketability. Orders that lack a condition precedent or orders that have been completely filled may be depicted at an end of the chart or may be removed from the chart. The order series 300 may also be sorted in a reverse order from that depicted in FIG. 3.

The order series 300 may be sorted according to one or more other criteria in addition to marketability or instead of it. These criteria may including, for example, asset type, order ID number, total transaction amount, order quantity, age (e.g., the length of time that the order has been active or since the time in which the order was entered), condition precedent, etc. For example, the primary sort variable may be the asset and a secondary sort variable may be the marketability. In an embodiment of the invention, third, fourth, fifth, etc. sort variables may also be selected, as well. Sorting may be user-configurable according to an embodiment of the invention, so that the user may select or change the sort variable or variables to use for the order series 300.

As FIG. 3 depicts, setup buttons 314 and 315 may also be provided to bring up configuration pop-ups or screens (not depicted) that allow the user to configure, for example, any of the user configurable functions described herein. Other configurable functions will be apparent to those of skill in the art, and may be included as well.

FIG. 4. depicts an order series 300 that is incorporated in an exemplary trading screen 400 according to an embodiment of the invention, which may be displayed, for example, on a display 516 connected to a trader workstation 544, as depicted in FIG. 6. In this example, the order reference number 401 column includes order reference numbers 401 (e.g., 1-15) for each order on trading screen 400. This order reference number 401 lists each order in the sequence that the order was entered.

As may be seen in this example, the orders on trading screen 400 are sorted by the order reference number. Alternately, as described for order series 300, trading screen 400 may be sorted by other variables, including, for example, by marketability, asset, order ID number, total transaction amount, order quantity, the order's age (e.g., the length of time that the order has been active or since the time in which the order was entered), condition precedent, etc. More than one variable may be selected for sorting the trading screen 400. For example, the primary sort variable may be the asset and a secondary sort variable may be the marketability. Third, fourth, fifth, etc. sort variables may also be selected, as well. The sort variable may be user-configurable, so that the user may select or change the sort variable or variables used for trading screen 400.

The strategy name 402 column includes a name that was entered for each order.

The status 403 column may serve multiple functions in an embodiment of the invention. The status 403 shows the status of an order by displaying, for example, "Done" if an order has a complete fill, "CxlPFill" if an order has a partial fill, or "Cxl" if an order is active but does not have a fill. The status 403 also serves as a button on display 516 that allows a user to use one or more input devices 514 connected to trader workstation 544 to press "Cxl" or "CxlPFill" markers on display 516 to cancel an order that has not been filled or the remainder of an order that has a partial fill.

The SID 405 column depicts a serial ID number for each order. This is a unique ID number for the order which may be an automatically sequencing number and may optionally include one or more digits that designate the location at which the order was originally entered. For example, orders may have originated from one or more locations including, for example, trading workstation 544, trader server 580, application server 562, venue 588, etc. Each location may have a unique number that is incorporated as a component of some or all of the digits of the serial ID number. For example, "8857" and "8856" may designate that the SID 405 depicted for the order reference numbers 401 on lines 8 and 9 originated from different locations.

The price conv 406 column may serve multiple functions. The price conv 406 column shows the pricing convention used for the prices that are displayed, for example, a spread price, an equity price, a conversion ratio price, a merger price, etc. The price cony 406 also serves as a button on display 516 that allows a user to use one or more input devices 514 connected to trader workstation 544 to press the price conv 506 displayed for a particular order to select between, for example, the spread price, the equity price, the conversion ratio price, the merger price, etc.

In the exemplary of the invention, the next two columns of trading screen 400 display order series 300. In this exemplary embodiment of the invention, order series 300 includes a plurality of orders. Trading screen 400 is not intended to be limited by the trading strategies deployed by the user.

A signal strength indicator 200 is displayed for most of the orders shown on the exemplary trading screen 400. As shown in blank location 416, a signal strength indicator may not be shown for every order. The exemplary trading screen 400 shows a marketability graph 100 next to each signal strength indicator 200. It is important to note that trading screen 400 need not show both the marketability graph 100 and the signal strength indicator 200. Further, the signal strength indicator 200 and the marketability graph 100 need not be in adjacent columns. In the preferred embodiment of the invention, both are displayed side-by-side, as depicted in the order series 300 on trading screen 400. Note that the marketability graph 100 need not be depicted for every order, as shown in blank location 415, for example. Additionally, trading screen 400 shows an example of an order lacking a condition precedent in exemplary precondition location 414.

Other columns depicted in the exemplary trading screen 400 include a limit 407, a price 408, an AvgPx 409, an order quantity 410, and a fill quantity 411 for each order. Additionally, the exemplary embodiment of the invention shows, for example, fill markers 417 and 418 for each order.

Fill markers 417 and 418 graphically depict the fractional fill of each order.

In the fill quantity 411 column, a fill marker of a different shade or color fills some or all of the space behind the fill quantity 411 number to depict the fraction of the order that has been filled. If fill quantity 411 is zero then the order is completely unfilled and there will be no fill marker shown. If there is a partial fill, a partial fill marker 418 will be shown with a length that is proportional to the calculated fractional fill. For example, fill marker 418 fills 22% of the space allocated for the fill marker (i.e., 1,100 fill quantity divided by 5,000 order quantity=0.22 order fill=22% percent fill). If there is a complete fill, then the fill marker may, e.g., span the full allocated space, as depicted, for example, by fill marker 417. A bar graph is shown for fill markers 417 and 418, but a fill marker may be any color, shade, symbol, line, etc., suitable to convey the fractional fill of the order.

Referring to FIG. 6, the order information, including the strategy name, limit, price, quantity, etc. may have been entered by the user of trading workstation 544 using input device 516, it may have been transferred from another program running on trading workstation 544, it may have been communicated from another computer on network 584, such as, for example, trader server 580. Or, the order information may have come from any other source known to one of skill in the art.

The trading screen 400 may be configurable. A user may display any one of the columns in a different order or may display more or fewer columns than depicted. For example, blank column 404 may be inserted in any location. Alternately, blank column 404 may be inserted and then configured to display a column with any of the information available to trading screen 400, whether expressly described herein or otherwise known to one of skill in the art. Additionally, as demonstrated by the optional the slide bars 412 and 413, a plurality or orders and a plurality of columns may be displayed on trading screen 400.

Additionally, as shown on trading screen 400, and similar to the example depicted in FIG. 3, setup buttons may also be provided for some or all of the columns. In the example of trading screen 400, the column headings for signal strength indicator 200, visualization chart 100, the limit 407, the price 408, the AvgPx 409, the order quantity 410, and the fill quantity 411 may serve as buttons on display 516 on the screen so that, for example, a user may use one or more input devices 514 connected to trader workstation 544 to press the setup on a column header to bring up one or more configuration pop-ups or screens (not depicted) that allow the user to configure, for example, any of the user configurable functions described herein. Other configurable functions will be apparent to those of skill in the art, and may be included as well.

FIG. 5 depicts logical elements of a computer such as may be used as a trader workstation 544, which includes at least one processor 510 coupled to a communications channel or bus 512. The trader workstation 544 further includes at least one input device 514 such as, e.g., a keyboard, mouse, touch pad or screen, or other selection or pointing device, at least one output device 516 such as, e.g., an electronic display device, at least one communications interface 518, at least one data storage device 520 such as a magnetic disk or an optical disk, and memory 522 such as ROM and RAM, each coupled to the communications channel 512. The communications interface 518 may be coupled to a network (not depicted) such as the Internet. Data storage may also be accomplished with a computer-readable storage medium (CRSM) reader 536, such as, e.g., a magnetic disk drive, magneto-optical drive, optical disk drive, or flash drive, may be coupled to the communications channel 512 for reading from a CRSM 538.

The data storage device 520 or memory 522 may store instructions executable by one or more processors or kinds of processors 510, data, or both. Some groups of instructions, possibly grouped with data, may make up one or more programs, which may include an operating system 532 such as Microsoft Windows, Linux®, Mac OS®, or Unix®. Other programs 534 may be stored instead of or in addition to the operating system 532. It will be appreciated that a computer system may also be implemented on platforms and operating systems other than those mentioned, including, for example, cloud computing. Any operating system 532 or other program 534, or any part of either, may be written using one or more programming languages such as, e.g., Java®, C, C++, C#, Visual Basic®, VB.NET®, Perl, Ruby, Python, or other programming languages, possibly using object oriented design or other coding techniques.

Trader workstation 544 may comprise any suitable computer or computer system, including, for example, desktops, laptops, portable computing devices, cellular telephones, personal digital assistants (PDAs), servers, mainframes, terminals, or other computers or data processors, at least one display device 516 such as a computer monitor or other any other output device that can display information in a graphical or text-based format, and at least one input device 514 such as, for example, a keyboard, a mouse, a touch pad or screen, or other selection or pointing device.

FIG. 6 depicts an example of a computer network 600 configured as an electronic trading platform for computerized trading of assets, e.g., financial interests as mentioned above. However, in other embodiments of the invention disclosed herein or evident to those of skill in the relevant arts from the disclosure herein, network 600 may be configured to trade other assets. Network 600 may further be configured to perform other applications.

Network 600 according to an embodiment of the invention includes trader workstations 544 and at least one computer system 500 that communicates over a communications or computer network 584. For convenience, description of network 600 will proceed with respect to one computer system 500 with the understanding that the network may comprise more than one computer system 500. A computer system 500 comprises one or more computers 582 communicating over a LAN 583, and related processors, servers, memory, and one or more databases. The trader workstation 544 and the one or more computers 582 communicate over the network 584, which may comprise a private network, including leased lines and a router network or networks, or a public network such as the Internet, using, for example, the TCP/IP suite of protocols. The network 600 may comprise a closed network (including, e.g., a router network) or the Internet. Gateway directors, gateways, firewalls, etc. (represented by block 586) provide communication to and from the one or more computer 582 over the network 584. Gateway, web server and firewall computers and the functions they perform can be conventional and are not shown in the drawings or discussed in detail.

For convenience, a computer 582 is referred to herein as a "remote" computer. In one sense, a computer 582 is remote from trader workstations 544 in that they are separated by a communications network. However, a computer 582 may be considered remote from trader workstations 544 in the same LAN.

Embodiments of the invention may provide for processing and control of information and interfaces to be displayed by the one or more display devices 516 by the trader workstations 544 or the remote computer 582, or by a remote computer or computers implemented as a distributed processing system comprising a node or nodes located local to the one or more workstations and a plurality of nodes located remote from the workstations, which may include a central location and distributed locations.

Computer 582 may implement in software an interface server which interprets data and command inputs from trader workstations 544 and controls display of screens on trader workstation display device 516. The computer 582 perform various tasks including: (a) interpreting data and command inputs from trader workstations 544; (b) controlling the display of information and interfaces by the workstations, including providing and controlling the display of market information; (c) trading functions, e.g., routing orders to venues 588 such as exchanges and ECNs for matching or execution; (d) matching orders for trade execution; (e) receiving market information from sources 590 thereof or venues 588; (f) managing database 592, etc. The computers 582 may be collected in a LAN 583 to operate with databases or other computers. The computer may perform the functions described above and herein as a host, server or database manager.

Orders may be obtained, for example, from the user via one or more input devices 514 connected to trader workstation 544, another program running on the trader workstation 544, from another trader workstation 544, from trader server 580, and from any other sources accessible from network 584, such as venues 588, data sources 590, computer systems via gateways 586, application servers 562, or web servers 560.

One or more databases 592 store market data information for each tradable asset that may be displayed on display device 516. The processor 510 updates the database 592 based on new data received from venues 588 and sources 590. Market and other data are loaded into volatile memory 522 by a processor 510, so that current market data may be provided to display device 516. Trader work stations 544 may locally store market data, as updated by remote computer 582, or the market data may be processed for direct display on display device 516.

Pricing information such as may be used in connection with embodiments of the invention may be made available to the trading workstation 544, directly or indirectly, through the any of a variety of data sources 590, a trader server 580, or any other source of such data known in the art, via network 584 or internet 558, including, for example, the National Best Bid and Offer (NBBO), through market makers, through proprietary trading systems, or through any aggregator of bid and ask information for a given asset.

As mentioned, the network architecture of the network 600 depicted in FIG. 6 is exemplary, and other architectures may be employed as known in the art. For example, distributed computer system architectures may be employed. A cloud computing architecture may be used, for example. Trader workstations 544 may communicate with one or more local or regional computers or servers, which communicate with one or more host or central computers, or to still other local or regional computers which communicate with one or more venues 588, market data sources 590, or central computers. Also, a trader workstation 544 may communicate with local or regional computers and to a venue 588, market data source 590 or central computer, or computers. Local or regional computers with which trader workstations 544 may communicate perform some of the functions otherwise performed by a host computer or server 582. For example, a local or regional computer linked to a number of trader work stations 544 may perform functions specific to those trader workstations while a centralized computer performs functions applicable to many trader workstations.

While embodiments of the invention have been described and illustrated in connection with preferred embodiments, many variations and modifications as will be evident to those skilled in the art may be made without departing from the spirit and scope of the invention, and the invention is thus not to be limited to the precise details of methodology or construction set forth above as such variations and modifications are intended to be included within the scope of the invention. Except to the extent necessary or inherent in the processes themselves, no particular order to steps or stages of methods or processes described in this disclosure, including the Figures, is implied. In many cases the order of process steps may be varied without changing the purpose, effect or import of the methods described.

The invention claimed is:

1. A method for providing information relating to marketability of one or more orders, each order comprising one or more legs and each leg reflecting an interest in buying or selling a respective asset in one or more venues, the method being performed by a computer system that comprises one or more processors, one or more interfaces operatively coupled to at least one of the processors, and at least one electronic display device operatively coupled to at least one of the processors, and the method comprising:
   receiving through at least one of the interfaces first order information that, for a first order, includes at least information from which a price for the first order may be determined and for each of the legs of the order, identifies the respective asset and whether the respective asset is to be bought or sold;
   receiving through at least one of the interfaces first order pricing information that comprises information from which a passive price for the first order at a first time and an aggressive price for the first order at the first time may be computed; and
   presenting on the electronic display device a marketability graph for the first order, the marketability graph comprising, for the first order,
   (1) an axis having a length,
   (2) a passive price marker at a first location on the axis,
   (3) an aggressive price marker at a second location on the axis, and
   (4) an order price marker at a first location on the axis that represents the price of the order relative to the passive price of the order at the first time and the aggressive price of the order at the first time;
   subsequent to presenting the marketability graph for the first order, receiving through at least one of the interfaces second order pricing information that comprises information from which a passive price for the first order at a second time and an aggressive price for the first order at the second time may be computed; and
   in response to receiving the second order pricing information, modifying the marketability graph for the first order by moving the order price marker along the axis to a second location that reflects the price of the order relative to the passive price of the order at the second time and the aggressive price of the order at the second time;
   wherein modification of the marketability graph excludes modification of the size or position of the axis, the location of the passive price marker relative to the axis, and the location of the aggressive price marker relative to the axis.

2. A computer system for providing information relating to marketability of one or more orders, each order comprising one or more legs and each leg reflecting an interest in buying or selling a respective asset in one or more venues, the computer system comprising:
   one or more processors;
   one or more interfaces operatively coupled to at least one of the processors; at least one electronic display device operatively coupled to at least one of the processors; and
   a computer-readable storage medium operatively coupled to at least one of the processors and encoded with instructions that, when executed by at least one of the processors, cause the computer system at least to:
   receive through at least one of the interfaces first order information that, for a first order, includes at least information from which a price for the first order may be determined and for each of the legs of the order, identifies the respective asset and whether the respective asset is to be bought or sold;
   receive through at least one of the interfaces first order pricing information that comprises information from which a passive price for the first order at a first time and an aggressive price for the first order at the first time may be computed; and
   present on the electronic display device a marketability graph for the first order, the marketability graph comprising, for the first order,
   (1) an axis having a length, (2) a passive price marker at a first location on the axis, (3) an aggressive price marker at a second location on the axis, and (4) an order price marker at a first location on the axis that represents the price of the order relative to the passive price of the order at the first time and the aggressive price of the order at the first time;

wherein the instructions comprise instructions that, when executed by at least one of the processors, cause the computer system at least to:

subsequent to presenting the marketability graph for the first order, receive through at least one of the interfaces second order pricing information that comprises information from which a passive price for the first order at a second time and an aggressive price for the first order at the second time may be computed; and in response to receiving the second order pricing information, modify the marketability graph for the first order by moving the order price marker along the axis to a second location that reflects the price of the order relative to the passive price of the order at the second time and the aggressive price of the order at the second time;

wherein modification of the marketability graph excludes modification of the size or position of the axis, the location of the passive price marker relative to the axis, and the location of the aggressive price marker relative to the axis.

3. A computer-readable storage medium, non-transitorily encoded with instructions that, when executed by one or more processors within a computer system that comprises one or more interfaces operatively coupled to at least one of the processors and at least one electronic display device operatively coupled to at least one of the processors, cause the computer system at least to:

receive through at least one of the interfaces first order information that, for a first order, includes at least information from which a price for the first order may be determined and for each of the legs of the order, identifies the respective asset and whether the respective asset is to be bought or sold;

receive through at least one of the interfaces first order pricing information that comprises information from which a passive price for the first order at a first time and an aggressive price for the first order at the first time may be computed; and present on the electronic display device a marketability graph for the first order, the marketability graph comprising, for the first order, (1) an axis having a length, (2) a passive price marker at a first location on the axis, (3) an aggressive price marker at a second location on the axis, and (4) an order price marker at a first location on the axis that represents the price of the order relative to the passive price of the order at the first time; and the aggressive price of the order at the first time;

wherein the instructions comprise instructions that, when executed by at least one of the processors, cause the computer system at least to:

subsequent to presenting the marketability graph for the first order, receive through at least one of the interfaces second order pricing information that comprises information from which a passive price for the first order at a second time and an aggressive price for the first order at the second time may be computed; and in response to receiving the second order pricing information, modify the marketability graph for the first order by moving the order price marker along the axis to a second location that reflects the price of the order relative to the passive price of the order at the second time and the aggressive price of the order at the second time;

wherein modification of the marketability graph excludes modification of the size or position of the axis, the location of the passive price marker relative to the axis, and the location of the aggressive price marker relative to the axis.

\* \* \* \* \*